(12) United States Patent
Warburton-Pitt

(10) Patent No.: US 6,846,124 B2
(45) Date of Patent: Jan. 25, 2005

(54) COLLAR FOR A BARBED CONNECTOR

(76) Inventor: Stephen Warburton-Pitt, 73 Brighton Rd., Andover, NJ (US) 07821

( * ) Notice: Subject to any disclaimer, the term of this patent is extended or adjusted under 35 U.S.C. 154(b) by 0 days.

(21) Appl. No.: 10/264,369

(22) Filed: Oct. 4, 2002

(65) Prior Publication Data

US 2004/0067099 A1 Apr. 8, 2004

(51) Int. Cl.⁷ ................................................ F16L 55/00
(52) U.S. Cl. ........................ 403/282; 403/286; 403/287; 403/329; 285/148.16
(58) Field of Search ....................... 285/148.13, 148.16, 285/242, 243; 403/109.8, 246–251, 253, 263, 264, 282, 274, 286, 287, 297, 329, 333, 381, 352.6, 379.6, 409.1, 292, 293

(56) References Cited

U.S. PATENT DOCUMENTS

| | | |
|---|---|---|
| 2,314,236 A | 3/1943 | Mott |
| 3,174,777 A | 3/1965 | Lodholm et al. |
| 4,607,867 A | 8/1986 | Jansen |
| 4,635,972 A | 1/1987 | Lyall |
| 5,137,309 A | 8/1992 | Beagle |
| 5,140,738 A | 8/1992 | Pinkerman, Jr. |
| 5,186,572 A | 2/1993 | Frano et al. |
| 5,317,799 A * | 6/1994 | Chapman et al. ........... 285/256 |
| 5,868,435 A | 2/1999 | Bartholomew |
| 6,010,162 A | 1/2000 | Grau et al. |

* cited by examiner

Primary Examiner—John R. Cottingham
Assistant Examiner—Victor MacArthur
(74) Attorney, Agent, or Firm—David L. Davis

(57) ABSTRACT

A collar for a connection between a resilient tube and a rigid barbed connector. The collar comprises a generally cylindrical sleeve member having interior annular ridges. When the collar is installed on the tube surrounding the barbed connector, the ridges press into the tube and prevent expansion of the tube to prevent leakage between the tube and the connector.

5 Claims, 3 Drawing Sheets

COLLAR FOR A BARBED CONNECTOR

BACKGROUND OF THE INVENTION

This invention relates to a connection between a resilient tube and a rigid barbed connector and, more particularly, to a collar for such a connection which ensures a good seal between the tube and the connector.

Silicone tubing for use in the manufacture of pharmaceutical products has become increasingly commonplace. To connect a silicone tube to another silicone tube or to a vessel or the like, a rigid barbed connector is typically used. However, with the use of such a connection, there are usually small spaces between the interior surface of the silicone tube and the exterior surface of the barbed connector, since the silicone tube cannot completely contact the entire exterior surface area of the connector. These small spaces can harbor bacterial growth. It would therefore be desirable to improve the connection between a silicone tube and a barbed connector so that such bacterial growth is prevented.

SUMMARY OF THE INVENTION

According to the present invention, there is provided a collar for a connection between a resilient tube and a rigid barbed connector having at least one outwardly extending annular barb and a free end. An end of the tube is adapted to surround the barbed connector with at least one barb of the connector pressing into the interior of the tube. The inventive collar is adapted to surround the tube and the connector, and comprises a unitary sleeve member of generally cylindrical exterior configuration with a first end and a second end. The sleeve member includes first and second interior annular ridges. The first ridge is adjacent the first end of the sleeve member. The second ridge is spaced from the first ridge so that when the first ridge is aligned with the free end of the connector, the barb which is closest to the free end of the connector is between the first and second ridges. The first and second ridges are adapted to press into the exterior of the tube sufficiently to ensure a good seal between the tube and the connector.

In accordance with an aspect of this invention, the connector includes at least two annular barbs and the sleeve member includes at least one second ridge, there being one less second ridge than there are barbs on the connector.

In accordance with another aspect of this invention, the sleeve member further includes a plurality of fingers extending axially from the second end of the sleeve member. The distal end of each of the fingers includes a respective radially inwardly extending projection adapted to be radially below the radially outward level of a barb when the respective finger is in a relaxed state. At least one barb is exposed beyond the end of the tube. The distance from a projection to the first ridge is such that when the first ridge is aligned with the free end of the connector all of the plurality of fingers are relaxed and all of the plurality of projections are radially below the level of a barb. Accordingly, the collar can be slid over the tube beyond its end and when the plurality of fingers move radially inwardly after passing the first exposed barb the ridges are properly positioned relative to the connector to ensure a good seal between the tube and the connector.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
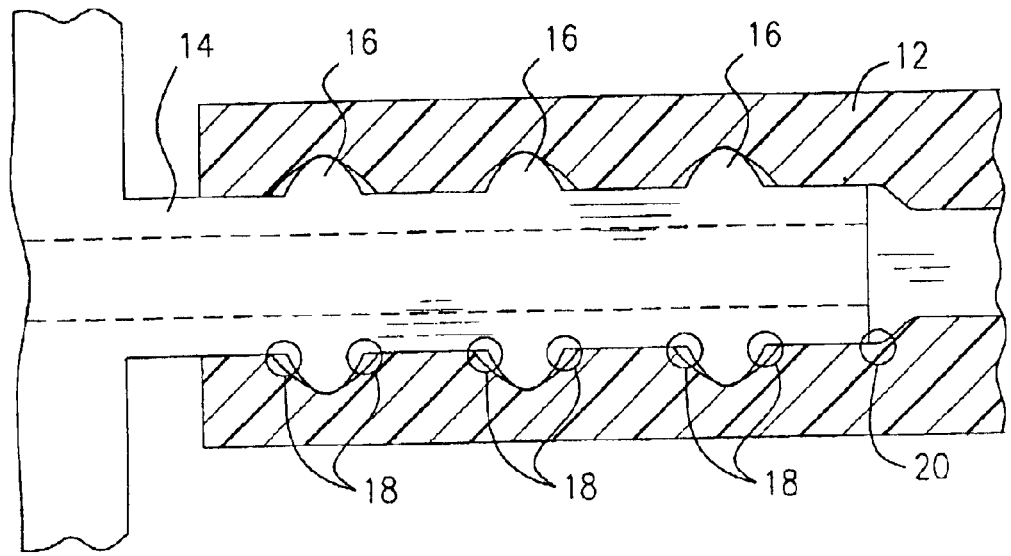
FIGS. 1 and 2 are side views of prior art connections showing a resilient tube (in cross-section) slid over a rigid barbed connector and illustrating areas of possible bacterial growth.

Referring now to the drawings, FIG. 1 shows a silicone tube 12 installed on a rigid connector 14 having barbs 16 in the form of annular ridges. The circled areas 18 denote spaces where the tube 12 does not directly contact the surface of the connector 14. These spaces provide areas which allow bacterial growth. The circled area 20 at the free end of the connector 14 denotes an area where pressure build up in the tube 12 can allow expansion of the tube 12 relative to the connector 14 to create a space for leakage of the contents of the tube 12 between the tube 12 and the connector 14.

Figure 2:
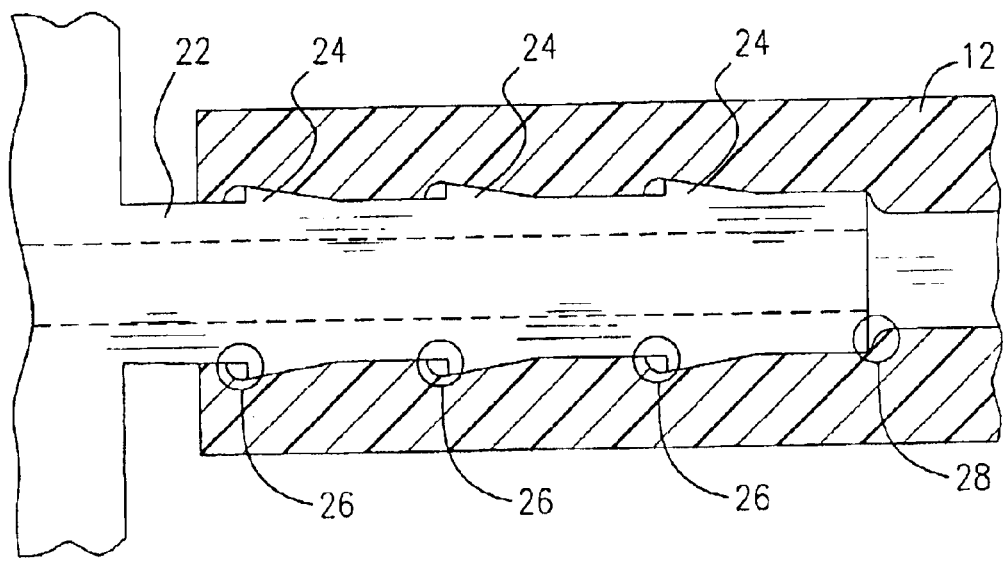

FIG. 2 is similar to FIG. 1 and shows a silicone tube 12 installed on a barbed connector 22 where the barbs 24 are in the form of annular saw teeth. The circles 26 denote spaces between the steep drop off points of the barbs 24 and the tube 12, similar to the spaces 18 (FIG. 1) and the circle 28 denotes a region at the free end of the connector 22 where pressure build up within the tube 12 can allow leakage of fluid between the tube 12 and the connector 22.

Figure 3:
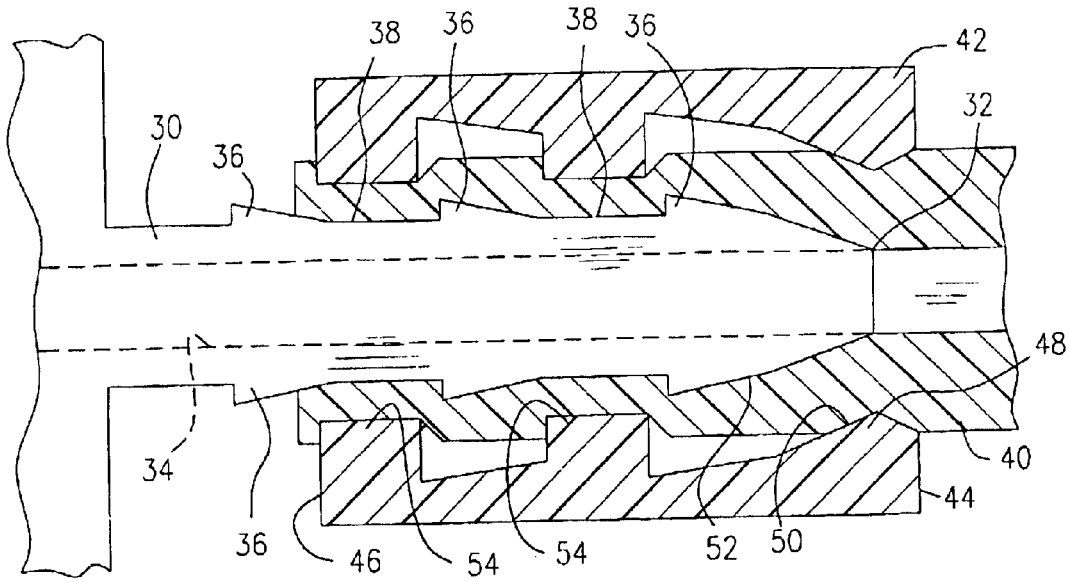
FIG. 3 shows a resilient tube (in cross-section) slid over a rigid barbed connector with a first embodiment of a collar (in cross-section) according to the present invention in place surrounding the resilient tube and the barbed connector.

FIG. 3 illustrates a first embodiment of the present invention wherein a rigid connector 30 is preferably tapered inwardly at its free end 32 so that it is relatively sharp surrounding its interior lumen 34. As shown, the connector 30 is formed with a plurality of barbs 36 in the form of annular saw teeth. Between adjacent barbs 36 are flat areas 38. A silicone tube 40 is slid over the connector 30 so that the barbs 36 press into the interior of the tube 40. According to a first embodiment of the present invention, a collar 42 is provided. Before the tube 40 is installed on the connector 30, the collar 42 is slid over the tube 40 beyond where the tube 40 will subsequently surround the connector 30. After the tube 40 is installed on the connector 30, the collar 42 is slid over the tube 40 to the position shown in FIG. 3 where it surrounds both the tube 40 and the connector 30.

The collar 42 comprises a unitary sleeve member of generally cylindrical configuration with a first end 44 and a second end 46. Adjacent the first end 44 is a first interior annular ridge 48. When the collar 42 is viewed in longitudinal cross-section, the ridge 48 is smaller at its apex than at its base. Preferably, the ridge 48 has a generally V-shaped configuration when the collar 42 is viewed in longitudinal cross-section. Preferably, the inwardly disposed side 50 of the ridge 48 is parallel to the taper 52 at the free end 32 of the connector 30 and when the collar 42 is properly positioned, the apex of the ridge 48 is aligned with the free end 32 of the connector 30. This maintains the tube 40 firmly in contact with the taper 52 at the free end 32 of the connector 30 so that the tube 40 cannot expand away from the free end 32 of the connector 30 and create a space for leakage of the contents of the tube 40. The sleeve member also includes at least one interior annular ridge 54 of a second type. The ridges 54 are preferably rectilinear when viewed in longitudinal cross section and are spaced from the first ridge 48 so that when the ridge 48 is aligned with the free end 32 of the connector 30, barbs 36 of the connector 30 are between ridges 50, 54 of the collar 42. Thus, the barb 36 which is closest to the free end 32 of the connector 34 is between the ridge 48 and the next closest ridge 54, and the next barb 36 is between the next two ridges 54. When the barbed collar 42 is positioned so that the apex of the first ridge 48 is aligned with the free end 32 of the connector 30, the ridges 54 overlie respective flat areas 38 between adjacent barbs 36. This prevents the tube 40 from separating away from the connector 30 between the barbs 36.

Figure 4:
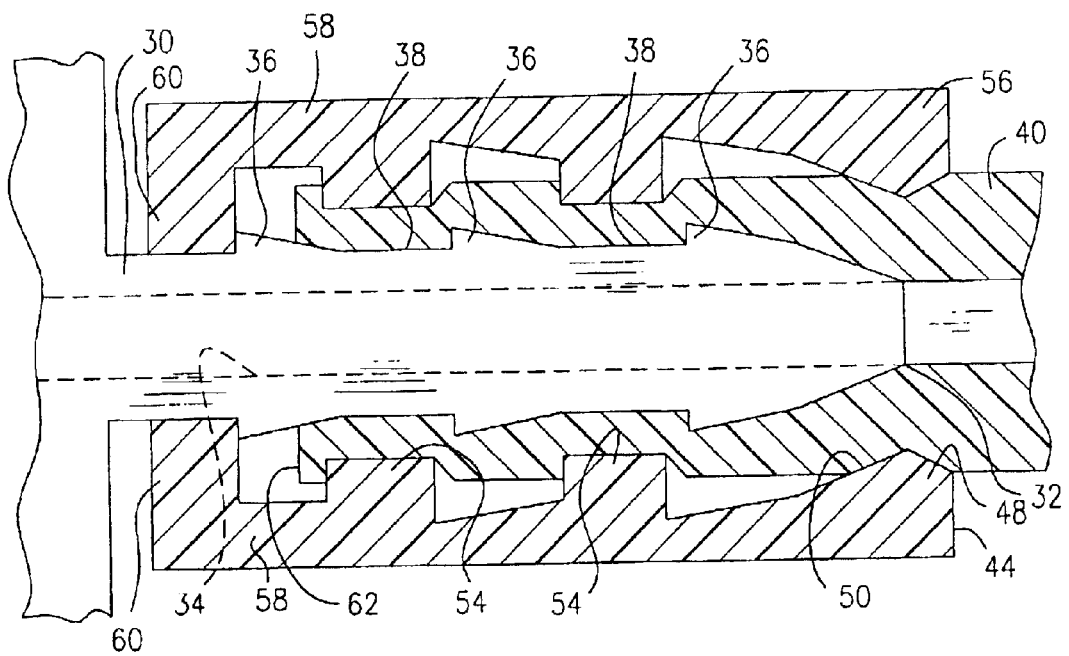
FIG. 4 shows a resilient tube (in cross-section) slid over a rigid barbed connector with a second embodiment of a collar (in cross-section) according to the present invention in place surrounding the resilient tube and the barbed connector.
Figure 5:
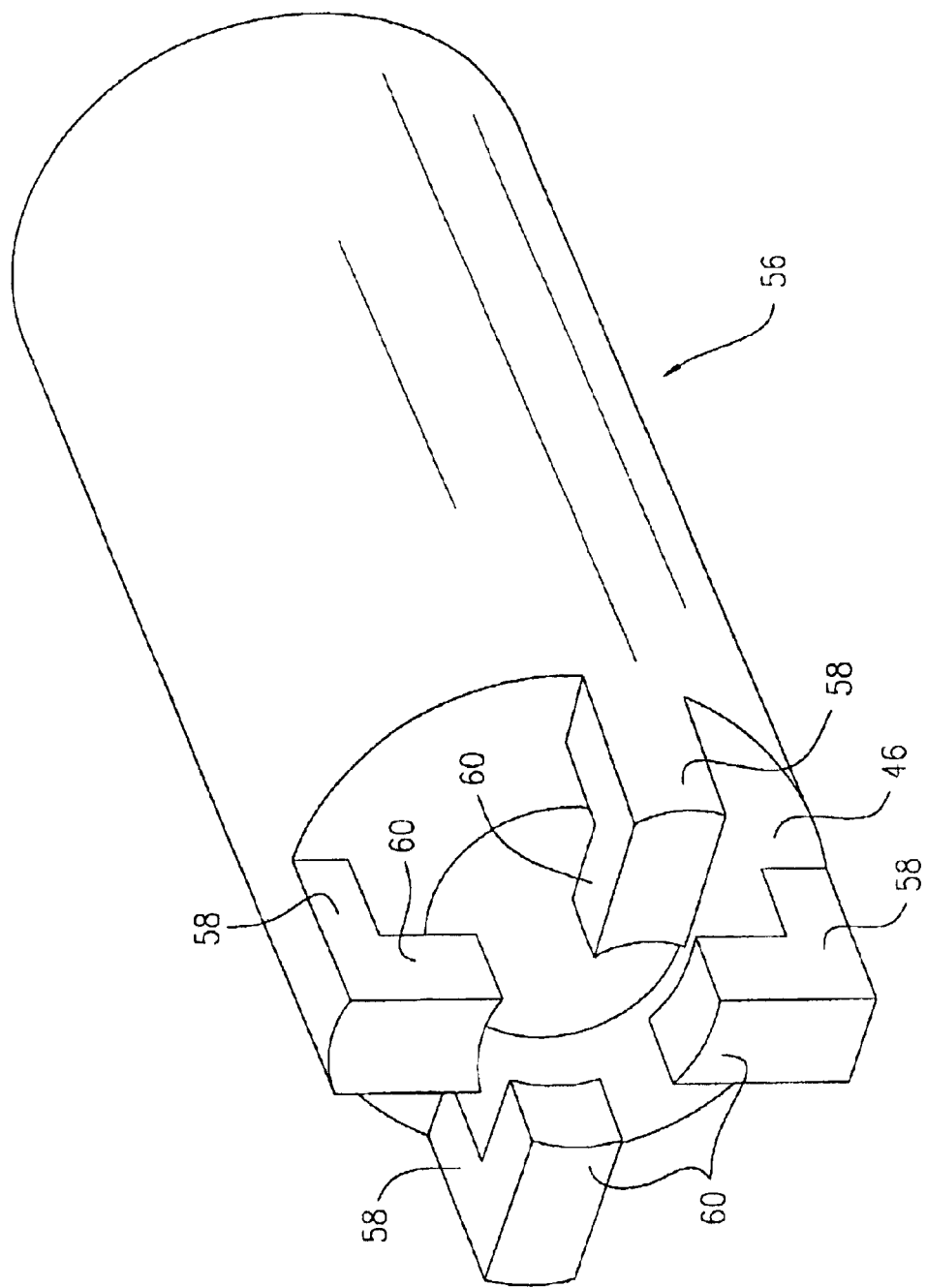
FIG. 5 is a perspective view of the inventive collar shown in FIG. 4.

As described above, the collar 42 must be properly positioned so that the ridge 48 is aligned with the free end 32 of the connector 30. In practice, such alignment may be difficult to achieve with the collar 42 shown in FIG. 3. Accordingly, the collar 56 shown in FIG. 4 has been designed to eliminate this difficulty. The collar 56 is substantially the same as the collar 42 with the addition of the unitary fingers 58 extending axially from the second end 46. Each of the unitary fingers 58 has at its distal end a radially inwardly extending projection 60. When the finger 58 is in a relaxed state, the projection 60 is radially below the radially outward level of a barb 36. As shown in FIG. 4, the projections 60 are so spaced from the ridge 48 that when the ridge 48 is aligned with the free end 32 of the connector 30, all of the fingers 58 are relaxed and the projections 60 are radially below the level of a barb 36.

To install the collar 56, as shown in FIG. 4, the collar 56 is first slid over the tube 40 away from the free end 62 of the tube 40. The tube 40 is then slid over the connector 30 to cover as many barbs 36 as there are ridges 54 of the second type, with at least one barb 36 being exposed beyond the free end 62 of the tube 40. The collar 56 is then slid toward the free end 62 of the tube 40, continuing until the projections 60 of the fingers 58 pass the free end 62 and snap inwardly just beyond the first exposed barb 36. In this position, the first ridge 48 is properly aligned with the free end 32 of the connector 30.

Accordingly, there has been disclosed a collar for a connection between a resilient tube and a rigid barbed connector, wherein the collar ensures a good seal between the tube and the connector. While illustrative embodiments of the present invention have been disclosed, it is understood that various adaptations and modifications to the disclosed embodiments are possible, and it is intended that this invention be limited only by the scope of the appended claims.

What is claimed is:

1. A collar for a connection between a resilient tube and a rigid barbed connector, the connector having at least one outwardly extending annular barb and a free end, wherein an end of the tube is adapted to surround the barbed connector with at least one barb of the connector pressing into the interior of the tube, the collar being adapted to surround the tube and the connector and consisting of a single unitary sleeve member of generally cylindrical exterior configuration with a first end and a second end, the sleeve member including:

a first interior annular ridge adjacent the first end of the sleeve member;

a second interior annular ridge spaced from the first interior annular ridge so that when the first ridge is aligned with the free end of the connector the barb which is closest to the free end of the connector is between the first and second ridges; and a plurality of fingers extending axially from the sleeve member second end, the distal end of each of the fingers including a respective radially inwardly extending projection adapted to be radially below the radially outward level of a barb when the respective finger is in a relaxed state;

wherein the first and second ridges are adapted to press into the exterior of the tube sufficiently to ensure a good seal between the tube and the connector;

wherein there is at least one barb exposed beyond the end of the tube; and wherein the distance from a projection to the first ridge is such that when the first ridge is aligned with the free end of the connector all of the plurality of fingers are relaxed and all of the plurality of projections are radially below the level of a barb;

whereby the collar can be slid over the tube beyond its end and when the plurality of fingers move radially inwardly after passing the first exposed barb the ridges are properly positioned relative to the connector to ensure a good seal between the tube and the connector.

2. The collar according to claim 1 wherein the connector includes at least one annular barb and the sleeve member includes at least one second ridge, there being the same number of ridges as there are barbs on the connector covered by the tube.

3. The collar according to claim 1 wherein the free end of the connector is tapered inwardly and the first interior annular ridge is smaller at its apex than at its base when the sleeve member is viewed in longitudinal cross-section.

4. The collar according to claim 3 wherein the first interior annular ridge has a generally V-shaped configuration when the sleeve member is viewed in longitudinal cross-section.

5. The collar according to claim 4 wherein a side of the first interior annular ridge is at an angle substantially equal to the angle of the taper at the free end of the connector so that the side of the first interior annular ridge is substantially parallel to the taper at the free end of the connector.

\* \* \* \* \*